US011562303B2

(12) United States Patent
Mimassi

(10) Patent No.: US 11,562,303 B2
(45) Date of Patent: Jan. 24, 2023

(54) SYSTEM AND METHOD FOR REAL-TIME GEO-PHYSICAL SOCIAL GROUP MATCHING AND GENERATION

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/665,056

(22) Filed: Feb. 4, 2022

(65) Prior Publication Data

US 2022/0164719 A1 May 26, 2022

Related U.S. Application Data

(63) Continuation of application No. 17/539,076, filed on Nov. 30, 2021, which is a continuation-in-part of
(Continued)

(51) Int. Cl.
*G06Q 10/02* (2012.01)
*G06Q 10/06* (2012.01)
(Continued)

(52) U.S. Cl.
CPC ......... *G06Q 10/02* (2013.01); *G06F 16/2379* (2019.01); *G06F 16/33* (2019.01);
(Continued)

(58) Field of Classification Search
CPC ................ G06F 16/2379; G06F 16/33; G06Q 10/06312; G06Q 10/06315; G06Q 10/10;
(Continued)

(56) References Cited

U.S. PATENT DOCUMENTS

| | | |
|---|---|---|
| 8,838,688 B2 | 9/2014 | Lin et al. |
| 10,664,929 B2 | 5/2020 | Childers et al. |

(Continued)

FOREIGN PATENT DOCUMENTS

| | | |
|---|---|---|
| WO | 2016094765 A1 | 6/2016 |

*Primary Examiner* — Richard W. Crandall
*Assistant Examiner* — Andrew Chase Lakhani
(74) *Attorney, Agent, or Firm* — Galvin Patent Law LLC; Brian R. Galvin; Brian S. Boon

(57) ABSTRACT

A system and method for real-time geophysical social grouping comprising customer profiles and venue profiles, wherein the profiles comprise expressed and inferred attributes, and a social grouping and recommendation server which utilizes machine learning algorithms on the profiles to generate recommendations for social group pairing, venues, and activities. Attribute matching provides optimized grouping between customers who share certain commonalities while also providing venues a system for locating and attracting ideal customers. Machine learning algorithms may be used to analyze profile attributes and identify patterns of commonality that would not otherwise be recognized. This system allows patrons to meet, dine, and socialize with one or more matched individuals at a venue that satisfies all participants preferences and attributes.

8 Claims, 9 Drawing Sheets

PageRank Clustering Analysis

Related U.S. Application Data application No. 17/332,491, filed on May 27, 2021, which is a continuation of application No. 17/220,276, filed on Apr. 1, 2021, now abandoned, which is a continuation-in-part of application No. 17/216,360, filed on Mar. 29, 2021, which is a continuation of application No. 17/037,200, filed on Sep. 29, 2020, which is a continuation-in-part of application No. 16/993,488, filed on Aug. 14, 2020, now abandoned, said application No. 17/539,076 is a continuation-in-part of application No. 16/950,068, filed on Nov. 17, 2020, now Pat. No. 11,222,297, which is a continuation of application No. 17/097,443, filed on Nov. 13, 2020, now Pat. No. 11,257,105, which is a continuation of application No. 17/091,925, filed on Nov. 6, 2020, now Pat. No. 11,334,866, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442, said application No. 17/539,076 is a continuation-in-part of application No. 16/796,505, filed on Feb. 20, 2020, now abandoned.

(60) Provisional application No. 63/243,520, filed on Sep. 13, 2021, provisional application No. 63/143,326, filed on Jan. 29, 2021, provisional application No. 62/956,289, filed on Jan. 1, 2020, provisional application No. 63/143,361, filed on Jan. 29, 2021, provisional application No. 63/145,438, filed on Feb. 3, 2021, provisional application No. 62/938,817, filed on Nov. 21, 2019, provisional application No. 62/964,413, filed on Jan. 22, 2020, provisional application No. 63/070,895, filed on Aug. 27, 2020, provisional application No. 63/073,814, filed on Sep. 2, 2020, provisional application No. 62/938,822, filed on Nov. 21, 2019, provisional application No. 62/956,293, filed on Jan. 1, 2020.

(51) Int. Cl.

| | |
|---|---|
| ***G06Q 10/10*** | (2012.01) |
| ***G06Q 50/12*** | (2012.01) |
| ***G06F 16/33*** | (2019.01) |
| ***G06F 16/23*** | (2019.01) |
| ***G06Q 30/02*** | (2012.01) |

(52) U.S. Cl.
CPC . *G06Q 10/06312* (2013.01); *G06Q 10/06315* (2013.01); *G06Q 10/10* (2013.01); *G06Q 30/0251* (2013.01); *G06Q 30/0269* (2013.01); *G06Q 50/12* (2013.01)

(58) Field of Classification Search
CPC . G06Q 30/0251; G06Q 30/0269; G06Q 50/12
See application file for complete search history.

(56) References Cited

U.S. PATENT DOCUMENTS

| | | | | |
|---|---|---|---|---|
| 2009/0319288 | A1* | 12/2009 | Slaney | G06Q 10/10 705/1.1 |
| 2011/0055725 | A1* | 3/2011 | Folgner | G06F 3/0486 715/810 |
| 2012/0016745 | A1 | 1/2012 | Hendrickson | |
| 2012/0239683 | A1* | 9/2012 | Starkman | G06F 16/9535 707/769 |
| 2012/0296845 | A1 | 11/2012 | Andrews et al. | |
| 2012/0296973 | A1* | 11/2012 | Spivak | G06Q 30/0201 709/204 |
| 2012/0320427 | A1* | 12/2012 | Zheng | G06V 10/243 358/3.26 |
| 2013/0138577 | A1 | 5/2013 | Sisk | |
| 2016/0191446 | A1* | 6/2016 | Grol-Prokopczyk | H04L 67/141 709/206 |
| 2017/0278203 | A1 | 9/2017 | Mimassi | |
| 2018/0047071 | A1 | 2/2018 | Hsu et al. | |
| 2018/0150464 | A1* | 5/2018 | Ma | H04L 67/55 |
| 2018/0247228 | A1* | 8/2018 | Kattil Veetil | G06Q 50/12 |

* cited by examiner

PageRank Clustering Analysis

SYSTEM AND METHOD FOR REAL-TIME GEO-PHYSICAL SOCIAL GROUP MATCHING AND GENERATION

CROSS-REFERENCE TO RELATED APPLICATIONS

Priority is claimed in the application data sheet to the following patents or patent applications, the entire written description of each of which is expressly incorporated herein by reference in its entirety:

Ser. No. 17/539,076
63/243,520
Ser. No. 17/332,491
Ser. No. 17/220,276
Ser. No. 17/216,360
63/143,326
Ser. No. 17/037,200
Ser. No. 16/993,488
62/956,289
62/956,293
63/143,361
63/145,438
Ser. No. 16/950,068
Ser. No. 17/097,443
Ser. No. 17/091,925
Ser. No. 17/005,038
Ser. No. 16/796,342
62/938,817
62/964,413
63/070,895
63/073,814
Ser. No. 16/796,505
62/938,822

BACKGROUND

Field of the Art

The disclosure relates to the field of data processing, and more particularly to the field of processing data attributes to generate matched social groups.

Discussion of the State of the Art

As the global pandemic caused by COVID-19 begins to fade and society is allowed to gradually open back up to pre-pandemic norms, people are starving for social interactions. Simple activities such as going out to eat dinner at a restaurant, going to a movie theatre, and playing and attending sporting events are becoming acceptable again. Starved for social interaction, some people may just want someone who they can have dinner and a nice conversation with. People often want to go to local venues and do activities local to their area. Similarly, people often want to meet and engage with people who are local to them which makes it easy to meet up and socialize. However, finding interesting or likeminded people who share similar interests can be difficult and time consuming for an individual person, not to mention the time and effort it takes to locate a venue which provides the necessary requirements to satisfy each person in a social group.

What is needed is a system and method for real-time geophysical social group searching and matching that recommends individuals and venues based upon a plurality of attributes.

SUMMARY

Accordingly, the inventor has conceived and reduced to practice, a system and method for real-time geophysical social grouping comprising customer profiles and venue profiles, wherein the profiles comprise expressed and inferred attributes, and a social grouping and recommendation server which utilizes machine learning algorithms on the profiles to generate recommendations for social group pairing, venues, and activities. Attribute matching provides optimized grouping between customers who share certain commonalities while also providing venues a system for locating and attracting ideal customers. Machine learning algorithms may be used to analyze profile attributes and identify patterns of commonality that would not otherwise be recognized. This system allows patrons to meet, dine, and socialize with one or more matched individuals at a venue that satisfies all participants preferences and attributes.

According to a preferred embodiment, a system for real-time geophysical social group matching, is disclosed, comprising: a computing device comprising a memory, a processor, and a non-volatile data storage device; a database residing on the non-volatile data storage device, the database comprising profiles of customers and restaurants; a customer portal comprising a first plurality of programming instructions stored in the memory, and operating on the processor, wherein the first plurality of programming instructions, when operating on the processor, cause the computing device to: receive profile attributes for a first customer; store the information in the first customer's profile in the database; receive a connection from a first customer's mobile device via a network; and identify the first customer from an identifier received from the patron's mobile device; and a social grouping and recommendation engine comprising a second plurality of programming instructions stored in the memory, and operating on the processor, wherein the second plurality of programming instructions, when operating on the processor, cause the computing device to: receive a search query; retrieve the customer's profile in the database; retrieve a plurality of the restaurant profiles in the database; select and retrieve from the set of all customers who have enabled social dining, a subset of customer profiles whose location attributes fall within the range of the location attribute selected by the first customer; retrieve the subset of customer profiles in the database; process the first customer's profile and the selected subset of customer profiles through a machine learning algorithm to identify a pattern of similarities between the first customer and one or more of the selected subset of customers; and match the first customer to one or more of the subset of customers based on the pattern of similarities.

According to another preferred embodiment, a method for real-time geophysical social group matching is disclosed, comprising the steps of: receiving profile attributes for a first customer; storing the information in the first customer's profile in the database; receiving a connection from a first customer's mobile device via a network; identifying the first customer from an identifier received from the patron's mobile device; receiving a search query; retrieving the customer's profile in the database; retrieving a plurality of the restaurant profiles in the database; selecting and retrieving from the set of all customers who have enabled social dining, a subset of customer profiles whose location attributes fall within the range of the location attribute selected by the first customer; retrieving the subset of customer profiles in the database; processing the first customer's profile and the selected subset of customer profiles through a machine learning algorithm to identify a pattern of similarities between the first customer and one or more of the selected subset of customers; and matching the first customer to one or more of the subset of customers based on the pattern of similarities.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 1 a block diagram illustrating an exemplary system architecture for a real-time geophysical social grouping system.

DETAILED DESCRIPTION

Figure 1:
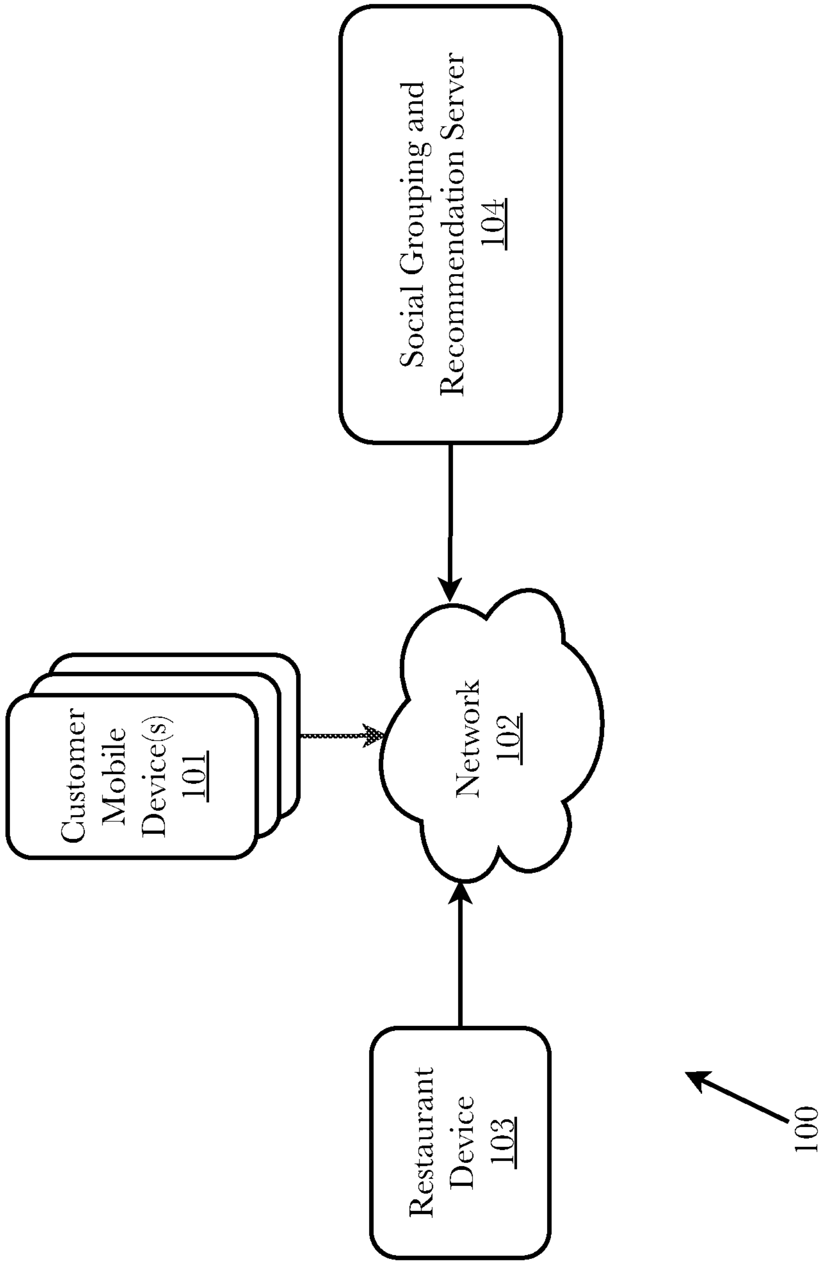

The inventor has conceived, and reduced to practice, a system and method for real-time geophysical social grouping comprising customer profiles and venue profiles, wherein the profiles comprise expressed and inferred attributes, and a social grouping and recommendation server which utilizes machine learning algorithms on the profiles to generate recommendations for social group pairing, venues, and activities. Attribute matching provides optimized grouping between customers who share certain commonalities while also providing venues a system for locating and attracting ideal customers. Machine learning algorithms may be used to analyze profile attributes and identify patterns of commonality that would not otherwise be recognized. This system allows patrons to meet, dine, and socialize with one or more matched individuals at a venue that satisfies all participants preferences and attributes.

A real-time geophysical social grouping system user may utilize the system to find one or more other matching system users to partake in an activity at a recommended venue. A social grouping and recommendation server, when given enough information about customers (users) and venues, provides recommendations on optimized social groups at ideal venues and times. For example, a first user may, through a mobile device application, conduct a search for a particular food type (or geographic search) and the system returns a list of venues and restaurants. The first user can enable "social dining" on their mobile device application and the system will connect the first user with other system users who have enables social dining. If the first user searches for lasagna, but a second user searches for a burger, the system may locate a restaurant that serves both lasagna and burgers on its menu, that would be a culinary match between the two users. The system may display a list of other users who have been matched with the first user. The first user may peruse the list and click on one of the displayed matches indicating the first user is interested in dining with the clicked upon displayed user. The clicked upon displayed user can then receive an invitation to accept the lunch invite or not. This process goes on until a paring is accepted by both users. Once a pairing is accepted, all non-compliant restaurants disappear from the list and only the "matching" restaurant remain on the list. Then the first user and the matched user(s) can chat and select from the available venues.

The above example was a simple example based on user food preferences, but the system can include subject matter preferences, for instance a user may want to have a nice lunch and talk about sports so the system may match the user with other users who like sports. A system user can select the reason for social dining (dating, companionship, discussion, networking, etc.) and the number of people to join. Although the examples of the real-time geophysical social grouping system used within this disclosure are often related to matching social groups in a restaurant and dining context, the system can also be extended to other events such as concerts, operas, airline seating, running, carpools, and many more activities. The system may provide functionality that makes social encounters more enjoyable. For example, the system could be used when creating carpools to match drivers with customers such that drivers are willing to carpool with likeminded, interesting, and engaging people in order to enhance the experience of the car driver and the riders.

As an example of another use case, the social grouping system may be leveraged to coordinate events such as pick-up games. For example, a system user may wish to drink tea and play the game Go. In the old days, the system user would join a local Go club, but in modern times social and hobby clubs do not exist much and certainly not it most areas. Furthermore, if such a club can be found it is usually schedule driven which removes the opportunity for spontaneity. Perhaps the system user has been blessed with an afternoon off from work and is yearning to play some Go and drink some tea with their newly liberated afternoon. The system user can submit a search query for tea and Go and the real-time geophysical social grouping system can locate both a venue which serves tea and match the system user with a second user who would also like to play Go. All the system user has to do is submit a search query and extend an invitation to the matched second user in order to scratch the Go playing itch they have. This happens in real time responsive to the received search query. Furthermore, the system may use the matched users locations when determining a venue to drink tea. For example, if the first user states a preferred travel distance of 30 miles and the second user states a preferred travel time of 30 minutes, then the system would optimize venue matching around those location and time constraints. For example, two users may be matched which live 45 minutes away from each other and the system may choose a venue that is 23 minutes travel time away from the first user and 22 minutes travel time for the second user.

In some embodiments, restaurants and other venues may leverage a subset of the data stored within the system in order to make business decisions. For example, within a geographic location, such as a city, there may be many system users who are all looking for a specific type of social gathering. This data may be made available to a venue manager such that the venue may then become the go to destination for that specific type of social gathering. For example, there may be a large plurality of local system users who are looking for people to play Go with and a venue which would allow. A café owner may use this information to market her café as the go-to spot for playing Go. In this way, venues may increase their customer base and enhance their marketing efforts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

"Server" or "Waitstaff" as used herein are individuals who work at a restaurant, bar, or other business establishment, attending to customers by supplying them with food and drink as requested. Servers may take on additional roles such as clearing and setting tables, greeting customers, or duties in the kitchen. Where the term "server" is used in the context of computer hardware, it shall have the meaning associated with computer hardware.

Conceptual Architecture

FIG. 1 is a block diagram illustrating an exemplary system architecture 100 for a real-time geophysical social group matching system. In this embodiment, the geophysical social grouping system 100 comprises a social grouping and recommendation server 104 and a restaurant device 103, which may operate through a network 102 which provides the communication between the components, and may be accessed by one or more customer's mobile device(s) 101. Depending on the embodiment, the social grouping and recommendation server may operate on the restaurant device, or on a cloud-based server, or on a customer mobile device, or some combination of these options. For each customer, a profile is created and stored in a social grouping and recommendation server 104. A social grouping and recommendation server 104 may be a computing device that when given a plurality of customer and restaurant information, makes associations and recommendations about matching customers with both other system users and ideal venues via machine learning algorithms. A restaurant device 103 is typically a mobile computing device that connects to a restaurant's network 102 that may be used by servers as a point-of-sale or table management device or it may be used by patrons for entertainment or ordering services. According to an embodiment, restaurant device 103 may be used by restaurant staff (e.g., owners, operators, managers, servers, kitchen staff) to input a plurality of venue attributes. Venue attributes may comprise, but are not limited to data such as hours of operation, type of venue (e.g., diner, café, bakery, bar, restaurant, music venue, etc.), food type of restaurant (e.g., Mexican, Indian, Italian, etc.), menu, employee schedules, inventory, upcoming events, point-of-sales data, reservation lists, and employee profiles to name a few.

In a typical scenario, unique identification numbers from the customer's mobile device 101 are associated with a customer's profile where the customer's profile may comprise information such as the customer's name and email address. For example, a customer's mobile device may be uniquely identified via its media access control ("MAC") address or via the international mobile equipment identifier ("IMEI") number. The unique identification number from the customer's mobile device may be used to provide security and authentication of system users to ensure that customer (user) profiles and the data contained therein is protected against unauthorized access and manipulation. A plurality of methods may be utilized for registering first time customers. Front desk waitstaff may create a profile on the customer's behalf The customer could create a profile through a series of questions on a restaurant's device 103, tablet, website, or a mobile application. Creating a profile may be incentivized through free or discounted menu items or other motivational tactics. A customer may create a profile and input profile attributes via an application on the mobile device 101 or restaurants device 103. According to an embodiment, during the creation of a customer profile, a customer may grant the social grouping and recommendation server 104 permission to access one or more applications operating on the customer's mobile device 101 such as, for example, email applications, text messaging applications, phone call data, and social media applications. If customer permission is granted to the system 104 to access customer social media accounts, then customer authentication and verification may be conducted via the customer's social media login. Social grouping and recommendation server 104 may access the one or more permitted applications in order to retrieve expressed customer attributes or to infer customer attributes from gathered application data.

Servers may also create profiles as part of the onboarding process or during initialization of the real-time geophysical social group matching system 100. Server profiles include personal and professional traits including hobbies, food knowledge, and overall customer rating. Restaurants (and other venues) may also create profiles which include their location, themes, ambiance type, food selection, and other attributes. These profiles and their attributes are organized in a computational graph where smaller communities surrounding the customers may be identified. This allows patrons and restaurants to fall within the one or more customer community boundaries where the most attributes are shared, and recommendations may be made. Recommendations from the social grouping and recommendation server 104 improve as more information is gathered about the customers, servers, and restaurants.

Figure 2:
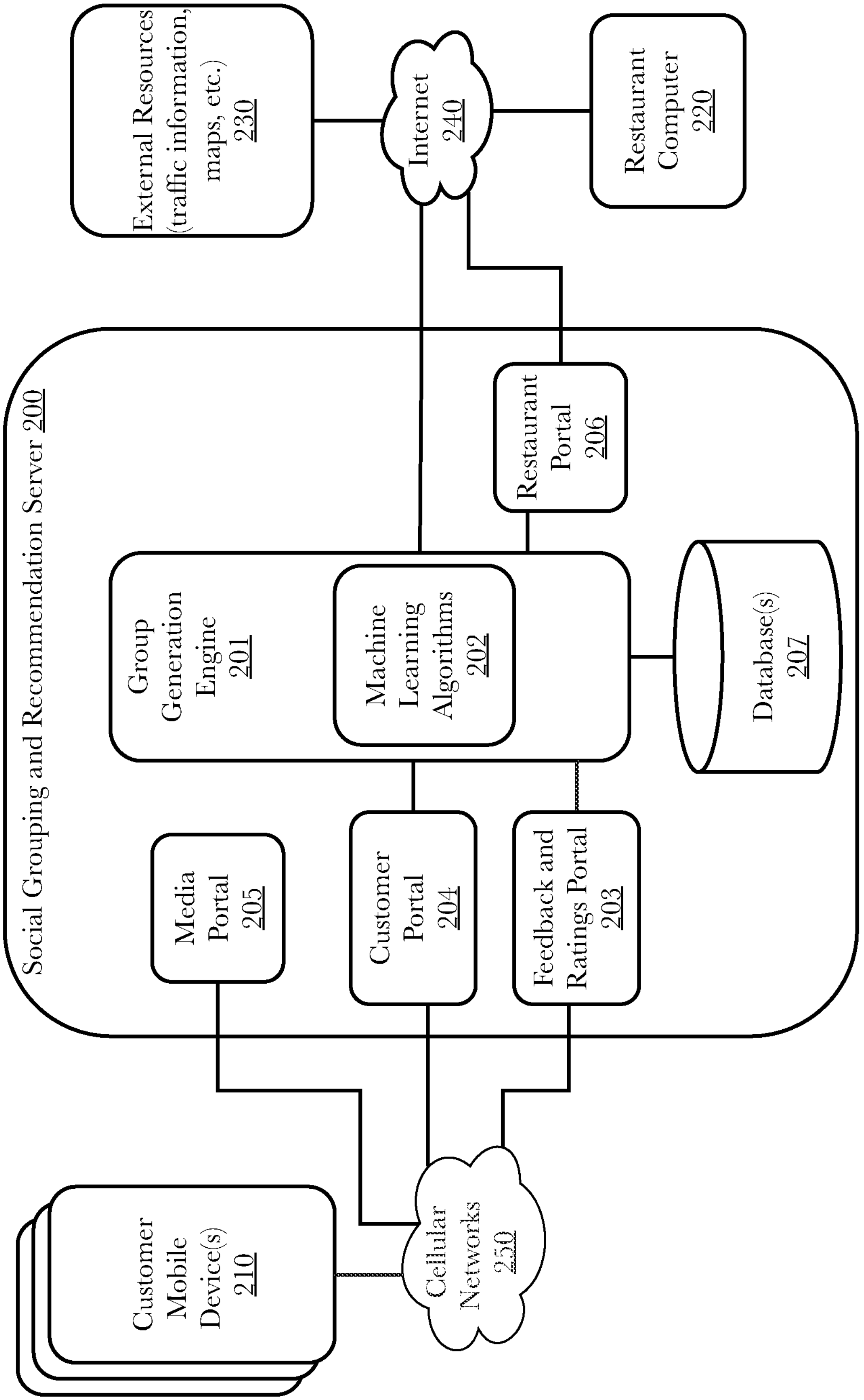
FIG. 2 is a block diagram illustrating an exemplary system architecture for a social grouping and recommendation server, according to an embodiment.

FIG. 2 is a block diagram illustrating an exemplary system architecture for a social grouping and recommendation server 200, according to an embodiment. According to an embodiment, social grouping and recommendation server 200 may connect to the internet 240 and other communication networks (e.g., cell phone network) in order to communicate and exchange data with a customer mobile device 210, a restaurant (venue) computer 220, and various external sources (e.g., traffic information, maps, venue website or web app, etc.) 230. Restaurant computer 220 may be any form of computing device such as a desktop computer, laptop, and mobile device. Restaurant computer 220 may connect to social grouping and recommendation server 200 via an internet connection 240 and utilize a restaurant portal 206 in order to create and interact with a restaurant profile which may be stored in a database(s) 207. Restaurant portal 206 allows participating restaurants (and other types of venues) to create a new restaurant profile and to edit, view, and delete existing restaurant profiles. A restaurant profile may comprise a plurality of venue attributes including, but not limited to business name, business hours, physical address, phone number, website address, menu, services provided, employee schedules, employee profiles, point-of-sale data, inventory data, reservation and waitlist information, special deals, and attributes that describe the environment of the venue such as, for example, venue ambiance and venue type (i.e., fast food, casual, fine dining, etc.).

Customer mobile device 210 may connect via a communication network (e.g., internet, cellular network 250, etc.) with social grouping and recommendation server 200 to facilitate various actions. The system 100 may include a mobile device application ("app") which a system user (customer) may download onto the mobile device using an appropriate application store associated with the customer's device. According to other embodiments, the system 100 may also provide a webapp that allows system users to interact with the system 100 without requiring to download an app or use a mobile device. Customer mobile device 210 may connect with social grouping and recommendation server 200 via a communication network through a customer portal 204 which provides similar functionality as the restaurant portal 206. Customer portal 204 allows participating customers to create a new customer profile and to edit, view, and delete an existing customer profile which is stored in database(s) 207. A customer profile may comprise a plurality of user attributes including, but not limited to customer name, age, phone number, physical address, email address, unique identifier, food preferences such as allergies and dietary restrictions, venue preferences, social preferences, personal and professional traits including interests and hobbies, purchasing history, and geographic preferences. Some of the customer attributes may be categorized as permanent attributes which indicates preferences that should always be considered when generating social group recommendations. For example, food allergies and dietary restrictions, customer location, and social preferences may all be considered permanent attributes. Other attributes may be categorized as temporary or situational attributes which are unique to a given social group search query. For example, the type of social gathering that is being sought after by the customer (e.g., dining, dating, networking, companionship, conversation, etc.) and the size of the social group are situational attributes that will most likely differ from one use of the system to the next.

According to some embodiments, the system 100 may have a variety of standard choices stored in database(s) 207 in regards to the type of social gathering that is being sought that system users can select from when initializing a social group search. For example, standard choices may include, but are not limited to dining, dating, networking, companionship, conversation, playing board games, exercising (e.g., running, tennis, swimming, etc.), and many more. Initially, each user may set up very specific social gatherings (e.g., play dominoes and drink tea) that no one else might match at that moment, but social grouping and recommendation server 200 may append each specific social gathering query to the standard choice database, thus extending the list of standard choices to include a wide variety of user defined social gathering types.

Customer portal 204 may also receive social group search queries from customer mobile device 210. Search queries may comprise what type of social gathering is being sought, situational attributes, and the unique identifier associated with mobile device from which the search query originated from, among other things. Once a search query is received, social grouping and recommendation server 200 may retrieve from database 207 a subset of customer profile data linked to the received unique identifier. The retrieved subset of customer profile data and the received search query may then be sent to a group generation engine 201 to be used as inputs for one or more machine learning algorithms 202 which generate recommendations such as matched social groups and matched venues. In some embodiments, a feedback and ratings portal 203 may receive customer feedback and ratings regarding recommended venues and social groups. Group generation engine 201 may use customer feedback and ratings to adjust machine learning algorithm training data, weights, biases, and various other algorithm parameters.

According to one embodiment, one method of performing matching using machine learning algorithms 202 is to create a directed graph of relationships, and to run graph analysis algorithms to identify associations within the graph, such as the shortest path between one or more customers, or the path with the greatest total edge weights between one or more customers (with greater edge weights implying more affinity). The main components of the computational graph are entities, attributes, and the relationships between entities and the attributes. Examples of entities include the names of customers, servers, and venues. Attributes include various items such as personality traits, performance metrics, personal information, business operational data, locality data, ratings, and other attributes belonging to customers, servers, and venues. The relationships are links between attributes and/or entities and are weighted based on the amount of commonality shared between entities. In one embodiment, the group generation engine 201 may reach out to varied external data resources 230 to request private and public databases for further information about customers, servers, and restaurants.

Group generation engine 201 may process the received search query, customer and venue attributes, and any external data in order to output a list of recommended matching venues and a list of recommended matching individuals. The two outputted lists may then be sent to a customer mobile device 210 wherein the customer who submitted the search query may view the recommended list. When a customer approves of and selects either a venue or an individual to extend an invitation to, the system 100 may link these selected venues and invited individuals to the customer profile stored within database 207 in order to provide the group generation engine 201 with customer selected outcomes which can enhance the effectiveness of the machine learning algorithms in future searching and matching functions. This and other types of data may be used by the system to infer customer attributes and preferences which are not explicitly expressed by the customer. For example, a customer's food order history may be used to infer that a customer often orders a chocolate cake desert after their dinner, and so group generation engine 201 may search for and match with restaurants that have a desert menu, and especially those restaurants that have chocolate cake listed as a menu item.

According to an embodiment, social grouping and recommendation server 200 may further comprise a media portal 205 which may be used to connect matched users in order to communicate between and amongst themselves via the system app on their mobile devices. Matched users may communicate with each other in order to coordinate their social activity, for example, to decide on a venue from the list of recommended venues or a time to meet up.

Detailed Description of Exemplary Aspects

Figure 3:
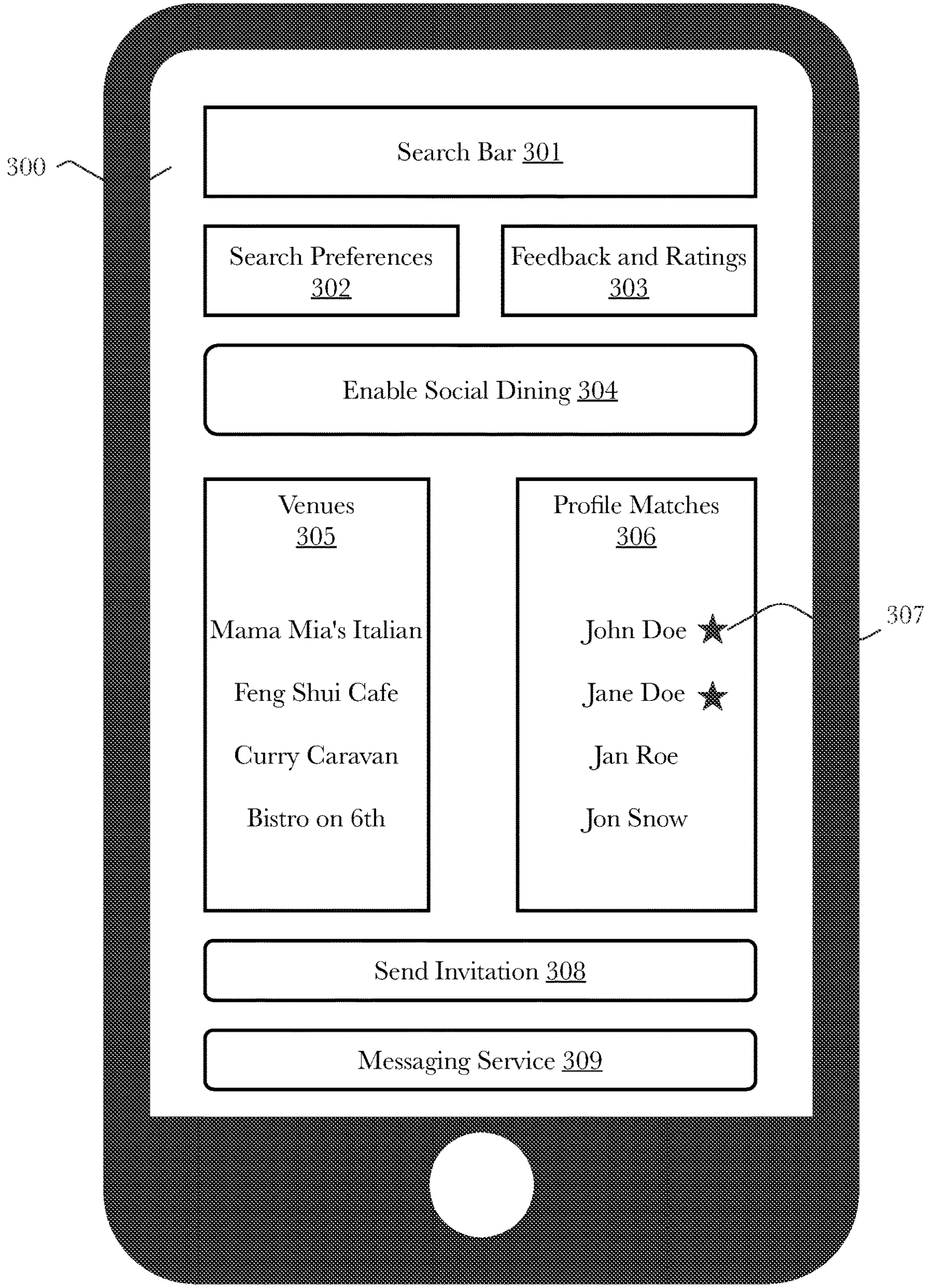
FIG. 3 is a diagram of an exemplary user interface for conducting social group searches operating on a mobile device, according to an embodiment.

FIG. 3 is a diagram of an exemplary user interface 300 for conducting social group searches operating on a mobile device, according to an embodiment. According to an embodiment, a mobile device application may provide a user interface ("UI") 300 for interacting with a real-time geophysical social grouping system 100. The UI may provide a search bar 301 where a device user can enter a search query. A search query may regard a variety of topics including, but not limited to a specific restaurant, a type of restaurant, a type of food, an activity (e.g., playing chess), and a type of social group. Additionally, the UI may provide standard search preferences 302 which provide the device user with a list of standard situational attributes which the user can view and select from in order to refine the query typed into search bar 301. For example, a device user may search for lasagna and the social grouping and recommendation server 200 may conduct a search for matching venues that sell lasagna and return to the mobile device a recommended list of venues 305 which satisfy the user search query. A feedback and ratings 303 button may be present which a device user can use to leave feedback and ratings about their dining experience. For example, a device user may access feedback and ratings 303 to leave a review about a meal he has have eaten, about the customer service he experienced, about the venues environment, and about his social dining experience such as the quality of his social group match (e.g., user did enjoy the company of a matched social group). Also present in the UI is a button that a device user can select to enable social dining 304. When social dining is enabled, social grouping and recommendation server 200 uses machine learning algorithms to search for and match other system users who have enabled social dining in order to recommend a social group appropriate to the device users attributes and preferences. Responsive to the device user enabling social dining, social grouping and recommendation server 200 generates a recommended list of individual profile matches 306.

Both the venue list 305 and the profile list 306 may allow the device user to click on a venue or person's name in order to see a snapshot of the venue or person's profile. For example, by clicking on a matched person's name from the profile match list 306, a device user may be able to see a subset of the matched person's attributes that were used to determine the quality of the match. This allows system users to have some background information about the matched person in order to assist the device user's choice of whether to extend an invitation to the matched person. Matched lists 305 and 306 may comprise strong and weak matches. In this exemplary embodiment, strong matches are indicated by a star symbol 307 next to the matched list item. In other embodiments, in place of a symbol, the matched lists may be displayed in ranked order where at the top of the list is the strongest match and matches degrade in strength as the list continues downward.

A device user may select from the matched profile list 306 one or more individuals whom they wish to socialize with and then the device user can click a send invitation button 308 that causes social grouping and recommendation server 200 to send an invitation request to the mobile devices corresponding to the selected one or more individuals. If an invitation is accepted by one or more of the selected individuals, then the device user and the invitee may be connected so that they can communicate via in-app messaging service 309. A system user can opt to receive invitation requests via a text message sent to his or her mobile device, or they may opt to receive invitation requests via his or her personal email instead of using the in-app messaging service 309. System users may set these preferences during or after creation of their customer profiles.

Figure 4:
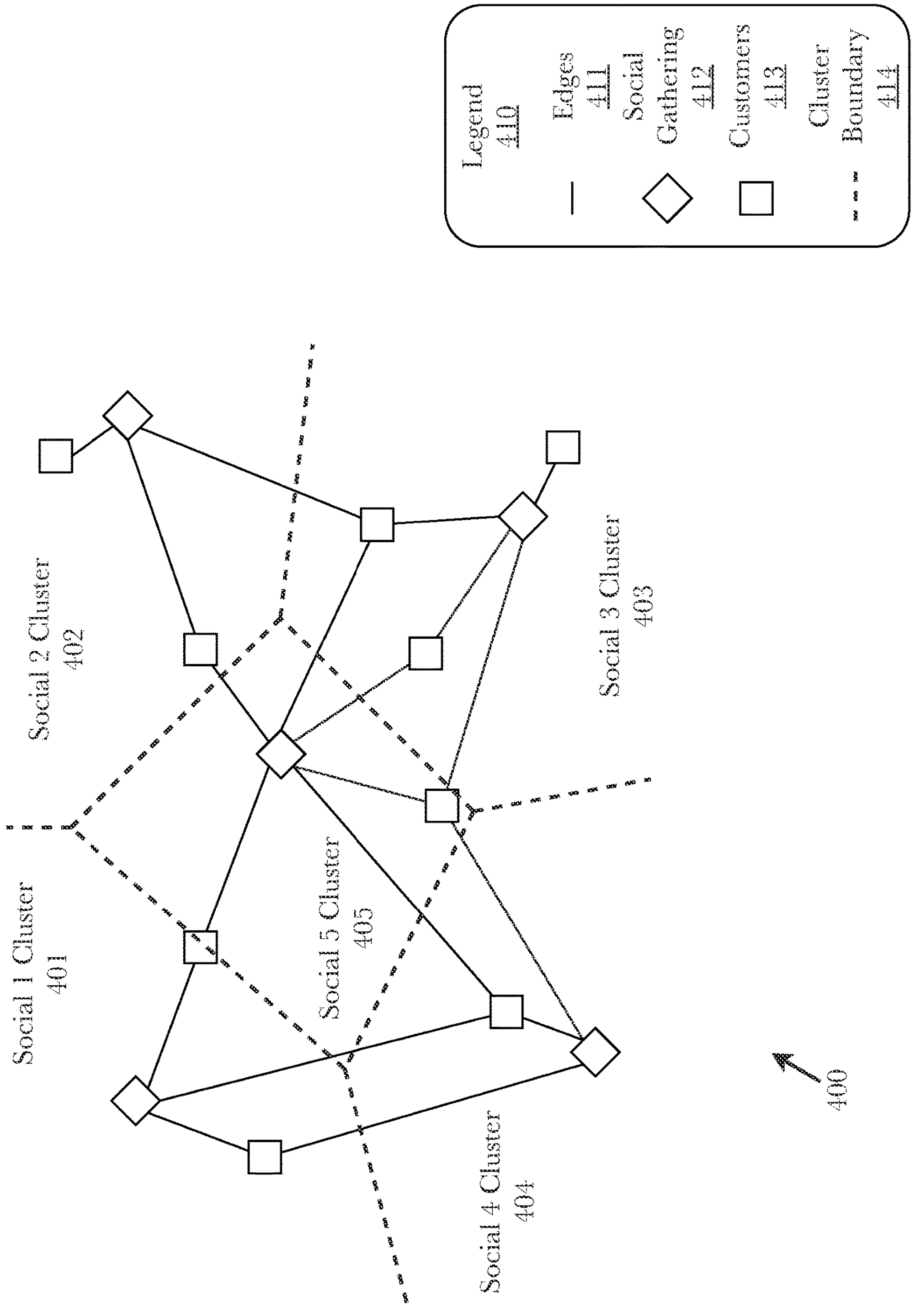
FIG. 4 is a diagram of an exemplary computational graph illustrating the use of cluster analysis for social group matchmaking.

FIG. 4 is a diagram of an exemplary computational graph 400 illustrating the use of cluster analysis for social group matchmaking. This diagram of an exemplary graph 400 and legend 410 shows a social gathering types (e.g., dining, networking, playing games, dating, etc.) 412, customers 413, and their edges 411 that form five clusters 401, 402, 403, 404, 405 from which a social grouping and recommendation engine can determine the ideal social groups 412 for each customer 413. For example, in this diagram, it can be seen that certain customers (indicated by squares) are solidly within the cluster of a particular social gathering type (indicated by diamonds), indicating a good match between the attributes of the customer(s) and the social group. Some customers fall near the dividing line between social gatherings (groups), indicating that either social group would be a good match, but that neither is ideal, as would be the case if the solidly was solidly in the social group's cluster.

This example is accomplished by a modified use of Google's PageRank algorithm coupled with clustering algorithms to highlight local community structure within the context of a larger network. There are many well-known cluster algorithms including k-means, spectral clustering, Markov cluster algorithms, and many more. However, PageRank is useful because it provides necessary structural relationships between nodes and is especially well-suited for clustering analysis. While PageRank was introduced as a web page graph, PageRank is well defined for any graph.

The main parameter in deriving the graph vectors between nodes is a scaling constant that includes two variance measures which can be used to automatically find the optimized values for this scaling constant in order to determine distances and clusters. The first variance measures discrepancies between the vectors of customer 413 nodes and possible closest social gathering nodes 412 by the probability distribution. The second variance measures large discrepancies between customer 413 nodes and the overall stationary distribution. The vectors determined by this constant use a set of centers of mass (social gatherings 412) to find the cluster boundaries 414 within the graph. Ideal solutions occur when the first variance is small, which indicate the estimates for the upper bounds of a cluster is accurate. When the second variance is large, then the centers of mass are quite far from the stationary distribution, capturing a community structure. The goal of the clustering PageRank algorithm is to find the appropriate scaling constant such that the first variance is small, but the second variance is large thus leading to a series of optimized clusters.

Figure 5:
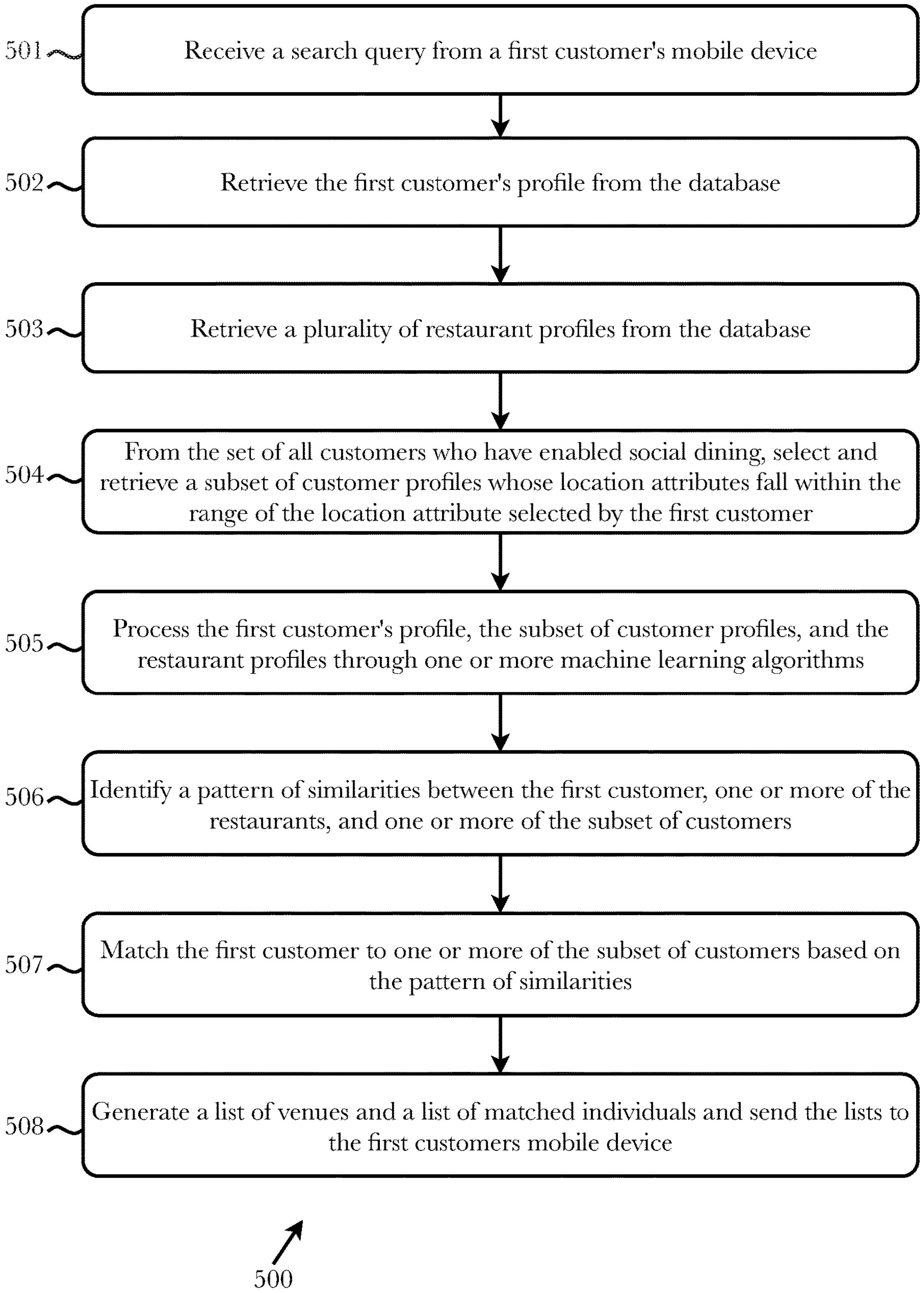
FIG. 5 is a flow diagram illustrating an exemplary method for generating social groups, according to one embodiment.

FIG. 5 is a flow diagram illustrating an exemplary method 500 for generating social groups, according to one embodiment. According to an embodiment, the process begins when the system 100 receives a search query from a first customer's mobile device 501. A search query may comprise one or more search terms and one or more user selected situational attributes. After a search query is received the next step is to retrieve the first customer's profile from the database 502. When a search query is received from a customer's mobile device, the unique identifier associated with that mobile device is also received and is used to search for the first customer's profile linked to the unique identifier. Next, the system retrieves a plurality of restaurant profiles from the database 503. Then from the set of all customers who have enabled social dining, the system selects and retrieves a subset of customer profiles whose location attributes fall within the range of the location attribute selected by the first customer 504. The system may then process the first customer's profile, the subset of selected customer profiles, and the restaurant profiles through one or more machine learning algorithms 505. After processing, the system identifies a pattern of similarities between the first customer, one or more restaurants, and one or more of the subset of selected customers 506. Next, match the first customer to one or more of the subset of selected customers based on the pattern of similarities 507. Then generate a list of matched venues and a list of matched individuals (customers) and send the lists to the first customer's mobile device 508.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
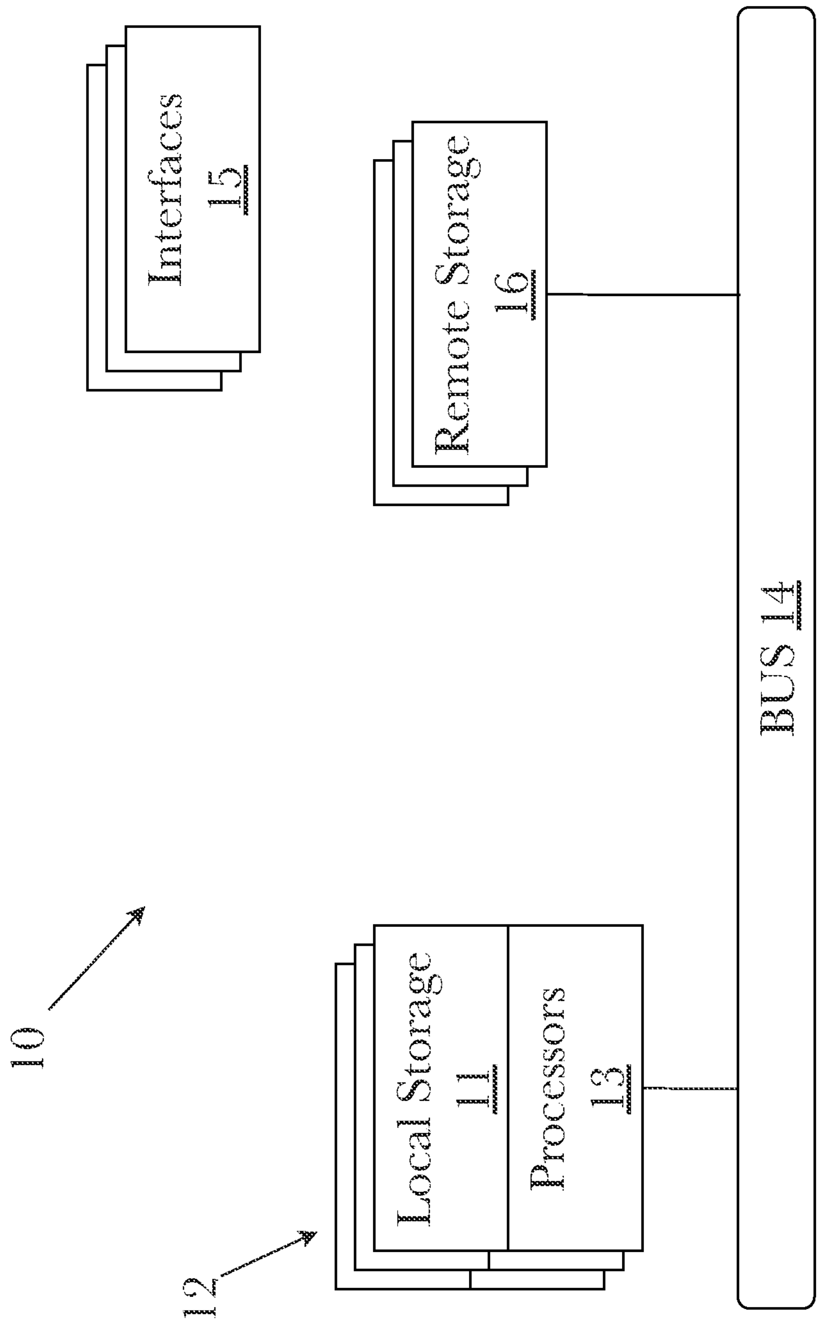
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
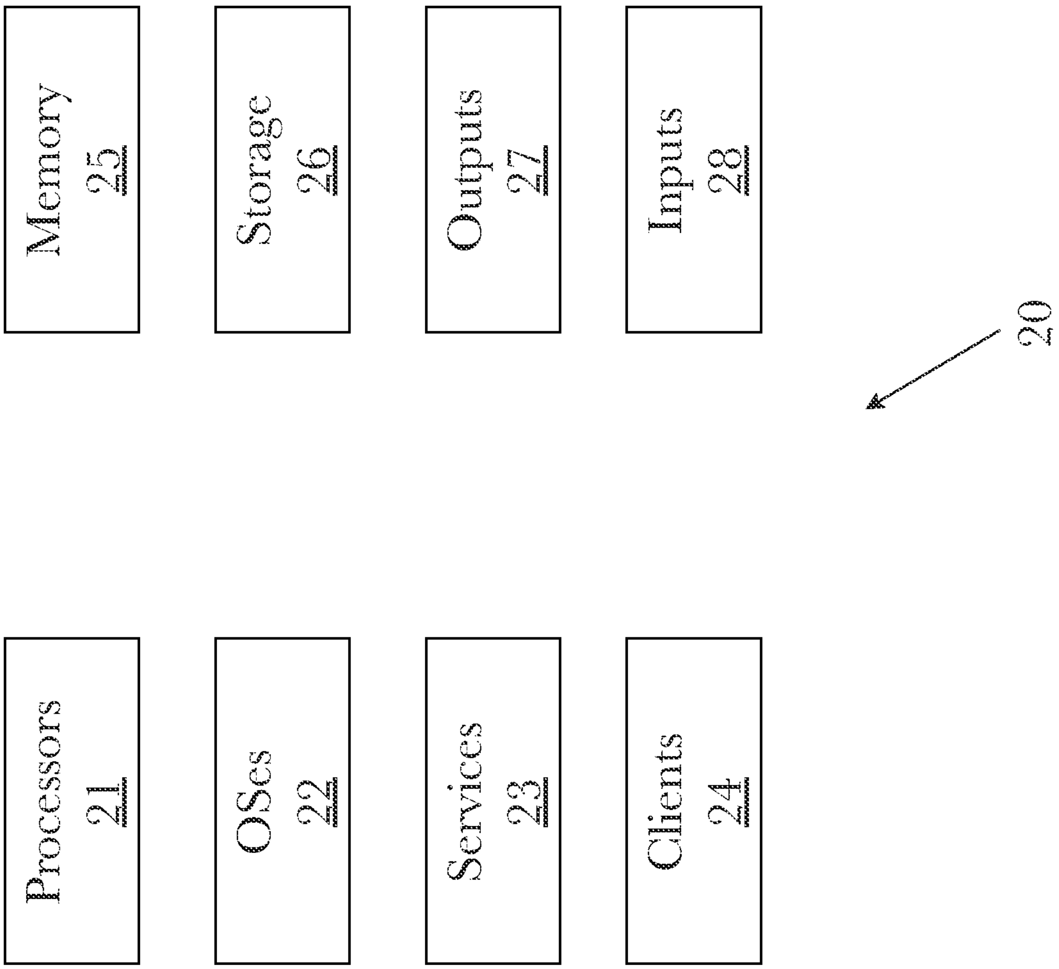
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
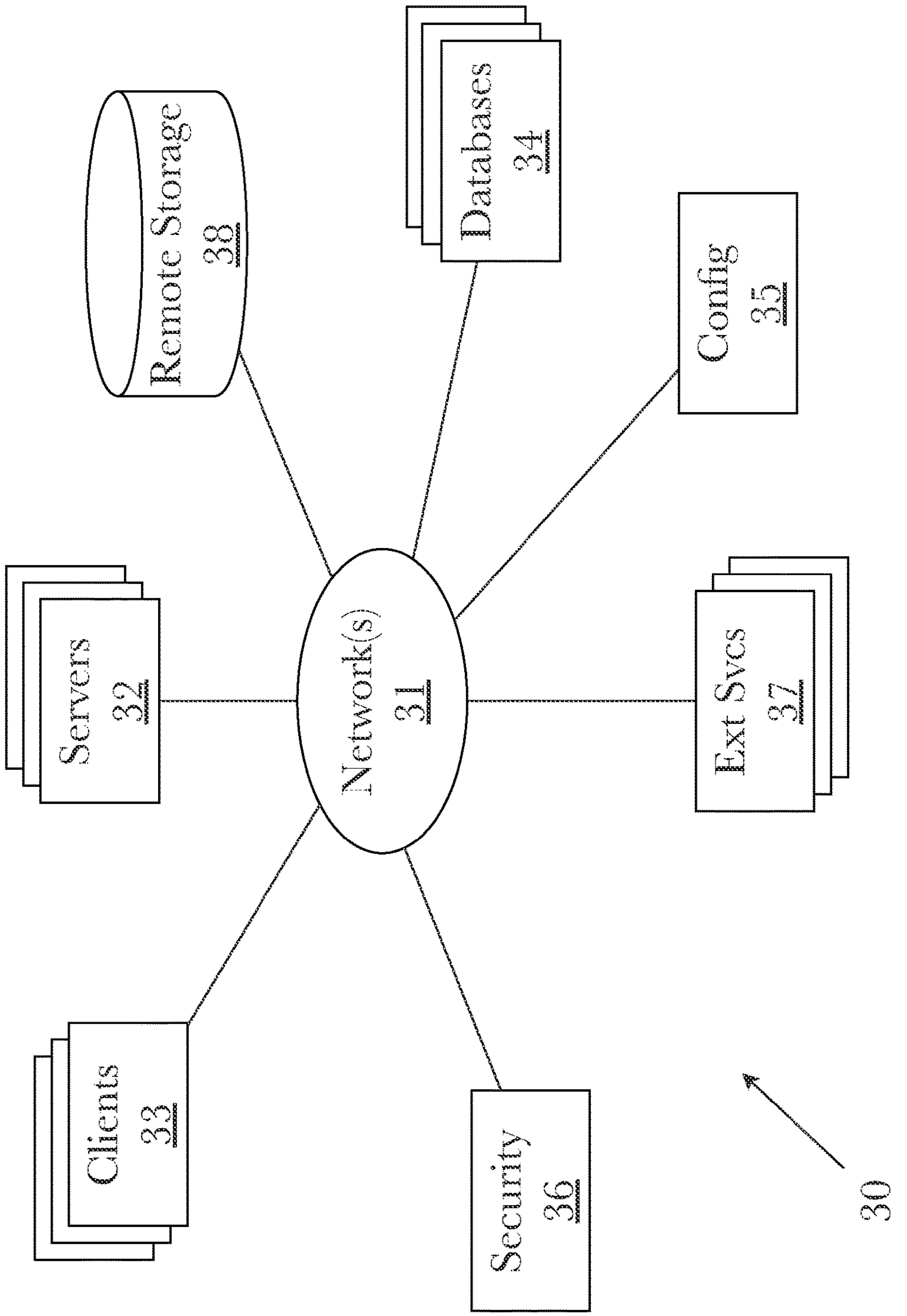
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
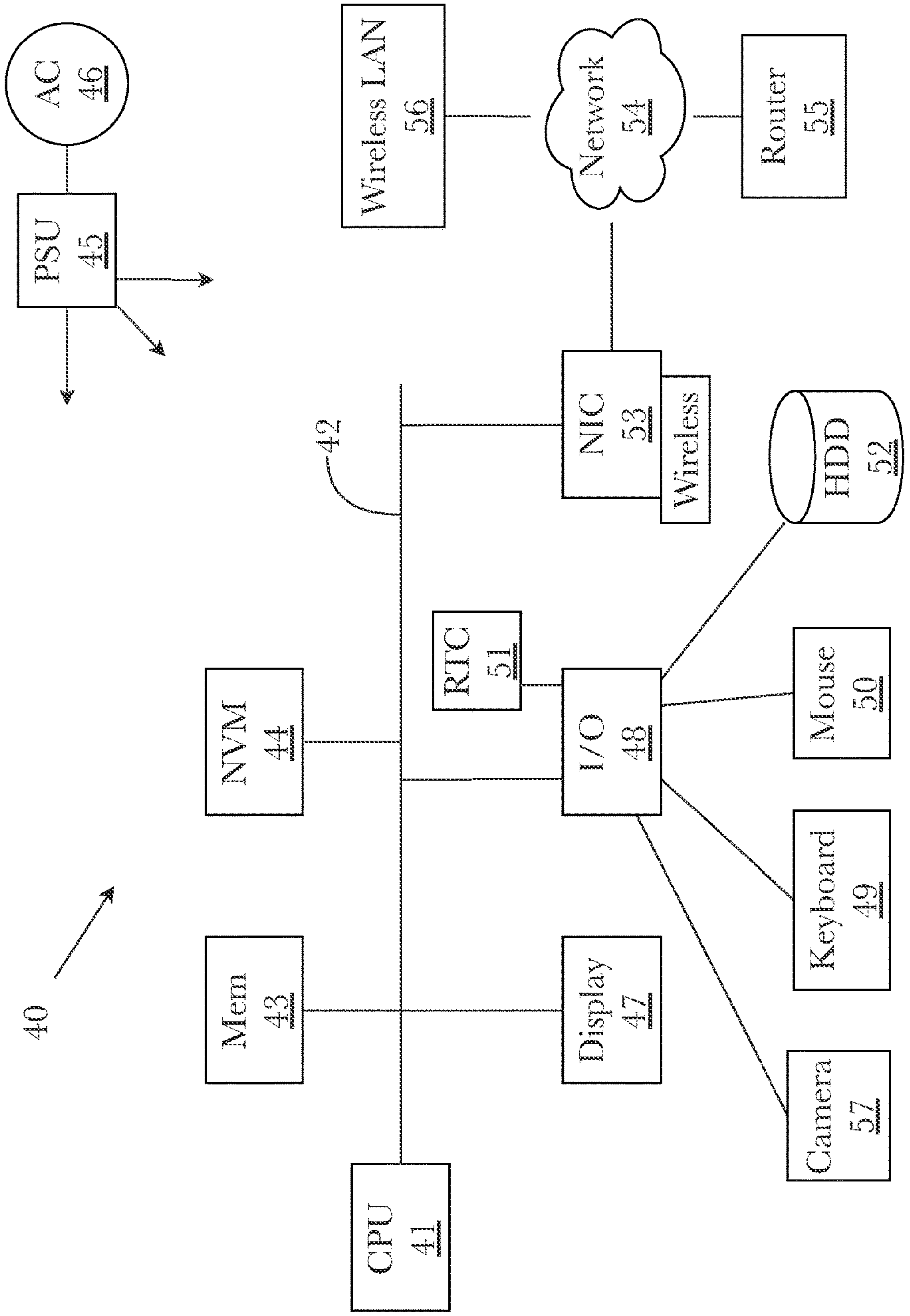
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A method for real-time geophysical social group matching, comprising the steps of:

storing a customer profile database on a non-volatile data storage device of a computing device comprising a memory, a processor, and the non-volatile data storage device, the customer profile database comprising customer profiles, each further comprising a plurality of customer attributes wherein at least one customer attribute is a customer location and at least one customer attribute is a range of travel preference;

storing a restaurant profile database on the non-volatile data storage device, the restaurant profile database comprising restaurant profiles, each further comprising a plurality of restaurant attributes wherein at least one restaurant attribute is a restaurant location;

using a customer portal operating on the computing device to perform the steps of:

receiving customer attributes for a first customer, the customer attributes comprising a customer location and a range of travel preference;

storing the customer attributes for the first customer in a first customer profile in the database;

receiving a search query via a connection from a mobile device of the first customer via a network, the search query comprising a geographical location, a request for a restaurant recommendation, and a request for matching of dining companions;

identifying the first customer from an identifier received from the mobile device;

retrieving the first customer profile from the customer profile database;

retrieving a plurality of restaurant profiles from the restaurant profile database;

selecting and retrieving from the set of all customer profiles in the customer profile database, a subset of second customer profiles whose ranges of travel from their customer location attributes fall within the geographical location contained in the search query;

retrieving the subset of customer profiles in the database;

selecting and retrieving from the set of all restaurant profiles in the restaurant profile database a subset of restaurant profiles whose restaurant locations fall within the geographical location contained in the search query;

creating a graph from the first customer profile, the subset of second customer profiles, and the subset of restaurant profiles, the graph comprising nodes representing customer attributes and restaurant attributes and edges representing vector relationships between the nodes, wherein:

the edges are determined by calculating a scaling constant comprising two variance measures, a first variance measuring discrepancies between customer attribute nodes and restaurant attribute nodes by probability distribution, and a second variance measuring discrepancies between customer attribute nodes and the overall distribution of customer nodes;

using the restaurant nodes of the graph as centers of mass to determine clusters of customer nodes; and matching the first customer to a restaurant and one or more of the subset of customers using the clusters; and providing the matches as a response to the search query.

2. The method of claim 1, wherein the database further comprises information from external factors, and the external factors are incorporated into the graph as either customer attribute nodes or restaurant attribute nodes.

3. The method of claim 1, wherein a portion of the information for the first customer, the selected subset of customers, or restaurant profiles is received from a social media account.

4. The method of claim 1, wherein the search query contains one or more search terms and one or more user selected situational attributes which are incorporated into the graph as either customer attribute nodes or restaurant attribute nodes.

5. A system for real-time geophysical social group matching, comprising:

a computing device comprising a memory, a processor, and a non-volatile data storage device;

a customer profile database residing on the non-volatile data storage device, the customer profile database comprising customer profiles, each further comprising a plurality of customer attributes wherein at least one customer attribute is a customer location and at least one customer attribute is a range of travel preference;

a restaurant profile database residing on the non-volatile data storage device, the restaurant profile database comprising restaurant profiles, each further comprising a plurality of restaurant attributes wherein at least one restaurant attribute is a restaurant location;

a customer portal comprising a first plurality of programming instructions stored in the memory which, when operating on the processor, causes the computing device to:

receive customer attributes for a first customer, the customer attributes comprising a customer location and a range of travel preference;

store the customer attributes for the first customer in a first customer profile in the database;

receive a search query via a connection from a mobile device of the first customer via a network, the search query comprising a geographical location, a request for a restaurant recommendation, and a request for matching of dining companions; and identify the first customer from an identifier received from the mobile device; and a social grouping and recommendation engine comprising a second plurality of programming instructions stored in the memory which, when operating on the processor, causes the computing device to:

retrieve the first customer profile from the customer profile database;

retrieve a plurality of restaurant profiles from the restaurant profile database;

select and retrieve from the set of all customer profiles in the customer profile database, a subset of second customer profiles whose ranges of travel from their customer location attributes fall within the geographical location contained in the search query;

select and retrieve from the set of all restaurant profiles in the restaurant profile database a subset of restaurant profiles whose restaurant locations fall within the geographical location contained in the search query;

retrieve the subset of customer profiles in the database;

create a graph from the first customer profile, the subset of second customer profiles, and the subset of restaurant profiles, the graph comprising nodes representing customer attributes and restaurant attributes and edges representing vector relationships between the nodes, wherein:

the edges are determined by calculating a scaling constant comprising two variance measures, a first variance measuring discrepancies between customer attribute nodes and restaurant attribute nodes by probability distribution, and a second variance measuring discrepancies between customer attribute nodes and the overall distribution of customer nodes;

use the restaurant nodes of the graph as centers of mass to determine clusters of customer nodes; and match the first customer to a restaurant and one or more of the subset of customers using the clusters; and provide the matches as a response to the search query.

6. The system of claim 5, wherein the database further comprises information from external factors, and the external factors are incorporated into the graph as either customer attribute nodes or restaurant attribute nodes.

7. The system of claim 5, wherein a portion of the information for the first customer, the selected subset of customers, or restaurant profiles is received from a social media account.

8. The system of claim 5, wherein the search query contains one or more search terms and one or more user selected situational attributes which are incorporated into the graph as either customer attribute nodes or restaurant attribute nodes.

* * * * *